United States Patent Office 3,517,485
Patented June 30, 1970

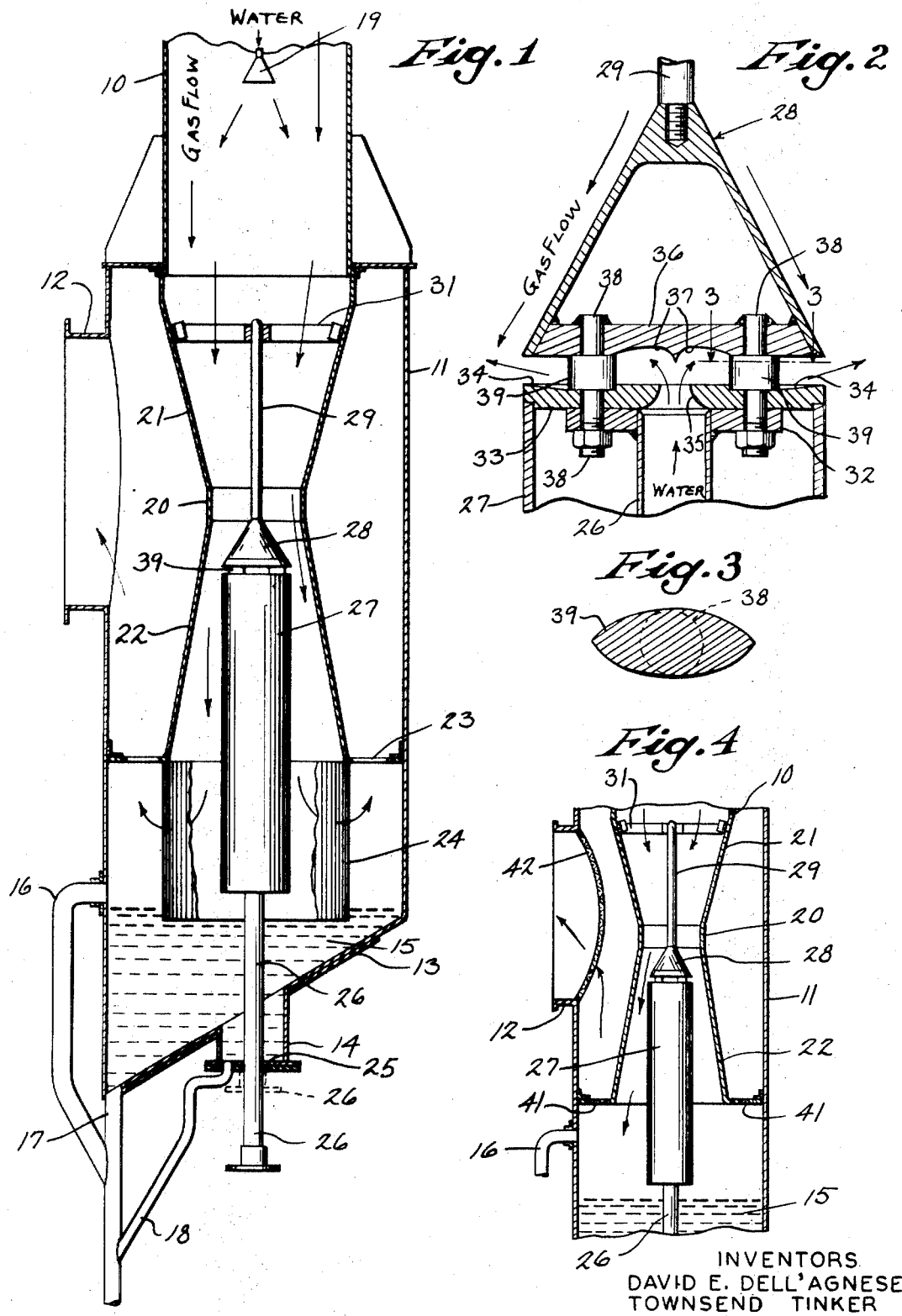

3,517,485
APPARATUS FOR TREATING GASES
David E. Dell'Agnese, Port Washington, Wis., and Townsend Tinker, Easton, Md., assignors to Modern Equipment Company, Port Washington, Wis., a corporation of Wisconsin
Filed Jan. 4, 1968, Ser. No. 695,609
Int. Cl. B01d 47/06, 47/10
U.S. Cl. 55—226             10 Claims

ABSTRACT OF THE DISCLOSURE

To cleanse waste industrial gases a Venturi chamber is provided with a combination annulus adjustment plug and washing liquid distributor including an upper plate having a specially-formed concavity in its undersurface against which water or other washing liquid is forcibly discharged, said concave plate surface deflecting the liquid downwardly against a lower plate which is formed to direct the same radially outwardly to intercept and entrain dirt particles and other suspended matter in the surrounding gas stream, said apparatus including means downstream of the Venturi chamber for separating said dirt-entraining liquid from the gas stream.

BACKGROUND OF THE INVENTION

Field of the invention

The present invention relates to the art of treating waste gases discharged by blast furnaces and other industrial equipment to minimize air pollution.

Description of the prior art

Heretofore a number of gas cleaning apparatuses or so-called gas scrubbers have been designed wherein the gases are directed through a chamber into which water or other liquid is sprayed to clean said gases, said spray providing a multitude of minute droplets which entrain and remove dust particles and other suspended matter from the gas stream to make the same less noxious. Examples of such prior gas treating devices are disclosed in the following United States patents: Pease, No. 1,992,762; Kleinschmidt, No. 2,235,998; Johnstone, No. 2,604,185; Walker, No. 3,116,348; and First, No. 2,813,597. In two of said patents, i.e. Johnstone No. 2,604,185 and Walker No. 3,116,348, a Venturi-type chamber is employed to obtain acceleration of the gas stream for improved results. Nowhere in said prior patents, however, is there disclosed a Venturi-type gas scrubber similar to the present invention wherein the washing liquid is directed against a combination annulus adjustment plug and spray head having a plurality of novel deflecting plates which promote the thorough atomization and dispersement of said liquid for improved cleaning action.

SUMMARY OF THE INVENTION

In the treatment of waste industrial gases in a so-called gas scrubber wherein a liquid washing spray is introduced into the central region of a gas stream it is desirable that said washing liquid be thoroughly broken up as it is engaged by the surrounding gas stream, thus providing a multitude of fine droplets which will impinge and entrain the dirt particles and other finely divided suspended matter in said gas stream. Unfortunately, conventional gas scrubbers are not entirely satisfactory in this respect. One of the principal purposes of the present invention, therefore, is to provide a new and improved gas treating apparatus having special liquid deflecting plates which are designed to promote the atomization of said washing liquid for superior cleaning action.

A further object of the invention is to provide an improved gas scrubber having a novel combination annulus plug and spray head which is axially adjustable to vary the width of the Venturi passageway, thereby permitting adjustment of the gas stream velocity for efficient operation at various gas supply rates.

A further object of the present invention is to provide a new and improved gas treating apparatus wherein the flow direction of the gas stream is abruptly reversed after said gases pass through the washing chamber to cause the water-entrained dirt particles to be thrown centrifugally from said gas stream into a pool at the bottom of said apparatus.

A further object of the invention is to provide a gas treating apparatus having novel moisture impingement trap means in the gas passage for purging dirt-entraining liquid droplets from the gas stream.

A further object is to provide an improved gas treating apparatus having special liquid spray means upstream of the Venturi chamber for wetting and protecting the walls of said chamber from dirt particle abrasion and wear, as well as providing additional dirt impaction and entraining means designed to act upon the gas stream.

A further object of the invention is to provide a novel gas treating apparatus having special means in the Venturi expansion chamber for reducing energy loss during deceleration of the gases.

Still further objects of the present invention are to provide a new and improved gas treating apparatus which is relatively inexpensive in design and construction, which is simple and reliable in operation, and which is otherwise particularly well adapted for its intended purposes.

BRIEF DESCRIPTION OF THE DRAWING

In the drawing, wherein the same reference numerals designate the same or similar parts in all of the views:

FIG. 1 is a vertical sectional view of the improved gas treating apparatus;

FIG. 2 is an enlarged fragmentary sectional view of the novel liquid distributing plate assembly featured in the invention;

FIG. 3 is a plan view of one of the plate-spacing members, taken along line 3—3 of FIG. 2; and FIG. 4 is a sectional view showing a modified moisture impingement trap arrangement that can be employed in the invention.

DESCRIPTION OF THE PREFERRED EMBODIMENTS

Referring now more particularly to FIG. 1 of the drawing, the gas treating apparatus comprising the present invention includes a conduit 10 which is designed to deliver exhaust combustion gases from a blast furnace or other industrial equipment, said supply conduit extending into the top of a coaxial cylindrical housing 11 having a lateral gas take off duct 12. The bottom 13 of said housing is inclined, as shown, and is provided with a short tubular extension 14 extending downwardly from the center thereof. Interconnected drain pipes 17, 18 depend from said bottom 13 and tubular extension members 14, respectively.

In the use of the present invention water 15 or other liquid is maintained in the lower portion of the housing 11, there being an overflow pipe 16 communicating with said housing at a point spaced above the lower end thereof to maintain the desired liquid level. As will be appreciated, the inclined nature of the housing bottom 13 prevents buildup of sediment in said liquid pool 15 and ensures effective evacuation through the drain pipes 17, 18. It is to be understood that while water may be satisfactorily used as the washing liquid in the present apparatus, the invention is not to be limited in this respect. Aqueous solutions may also be employed, or, for certain applications, it may be advantageous to use a non-aqueous solution.

Within the housing 11 the gas conduit 10 is shaped to form a Venturi chamber including a downwardly converging contraction or restriction portion 21, a throat 20, and a lower expansion section 22, there being a spider bracket 23 supporting the lower end of said Venturi in centered position within the housing. Depending from the lower end of said Venturi member in the illustrated embodiment of the invention is a coaxial cylindrical moisture impingement trap 24 which extends downwardly into the liquid pool 15, the function of which will be described hereinafter. Mounted in the conduit 10 above said Venturi chamber is an inlet nozzle 19 connected to a source of water or other liquid, said nozzle being designed to provide a continuous spray to wet and protect the walls in the acceleration region of said conduit from dirt particle abrasion and wear, as well as providing dirt impaction means designed to act particularly upon the outer periphery of the descending gas stream during the washing operation.

Referring still to FIG. 1 of the drawing, centered axially and extending upwardly through the housing bottom is an elongated water supply pipe 26 which is slidably journaled in the housing bottom extension 14, there being suitable sealing bushings 25 therefor. Said pipe 26 is movable from the illustrated full line position to the elevated position shown is broken lines, and has its lower end connected to a source of water or other washing liquid (not shown). Carried on the upper portion of said water supply pipe 26 is a cylindrical body or core 27 which is designed to provide means for streamlining the divergent exit passageway of the Venturi chamber to avoid undue energy loss during deceleration of the gases.

Mounted on and spaced immediately above the top of the body 27 is a conical, upwardly-tapered plug 28 which is positioned within the expansion section 22 of the Venturi immediately below the Venturi throat 20, said plug being axially adjustable in response to longitudinal movement of the pipe 26 to permit the surrounding Venturi passageway or annulus to be adjusted as desired. A vertical rod 29 extends upwardly from the apex of said conical plug 28 through a spider bracket 31 suitably secured to the inner wall of the Venturi chamber, said rod functioning to ensure the centering of said plug as well as preventing vibration and fatigue of parts.

Referring now to FIG. 2 of the drawing, it will be seen that a disc 32 is welded or otherwise rigidly secured on and surrounding the upper end of the water supply pipe 26 within the cylindrical body member 27. Overlying said disc is a plate 33, hereinafter referred to as the lower deflector plate, which is fitted onto the top of the body 27 and which is provided with a central orifice 35 through which water or other fluid delivered through the pipe 26 passes. Said plate 33 is secured to the disc 32 by means of a plurality of spaced bolts 38 which project upwardly above said plate, there being three of said bolts in the preferred form of the invention. The peripheral portion 34 of said deflector plate 33 is inclined outwardly, as illustrated, to cause water flowing radially outwardly on said plate to be directed upwardly at an angle from the horizontal, the purpose of which will be described.

Surrounding the upwardly projecting portion of each of the bolts 38 is a spacer member 39 which is tapered toward both ends (FIG. 3), as well as being rounded in a transverse plane, to provide a streamlined contour which does not materially impede the flow of water therearound. Rigidly secured on the bolts 38 above said spacer members 39 is a second plate 36, hereinafter referred to as the upper deflector plate, which forms the base of the cone 28. The undersurface of said plate 36 is provided with a circular concavity or dished portion 37 which radiates outwardly from the center of said plate to a point intermediate the diameter thereof, the function of which is to deflect water directed against the underside of said plate radially outwardly and downwardly onto the lower plate 33, as will be hereinafter described in greater detail.

In the operation of the improved gas treating apparatus comprising the present invention exhaust combustion gases from a blast furnace or the like are delivered through the conduit 10 under substantial pressure and velocity, there being suitable fan or blower means therefor as is well known in the art. Immediately prior to its introduction into the housing 11 said gas stream is subjected to a spray of water from the nozzle 19 which functions to impinge and entrain a portion of the dirt particles and other impurities in said gas, as well as wetting the conduit walls to minimize abrasion and wear.

The gas stream then continues downwardly into the converging portion 21 of the Venturi chamber, where it is further accelerated. Upon passing through the Venturi throat 20 said high velocity gases reach the combination annulus adjustment plug and spray head 28 featured in the present invention.

During the gas cleaning operation water or other suitable washing liquid is continuously delivered through the vertical pipe 26 and is forcibly discharged against the underside of the deflector plate 36 forming the base of the plug 28. Due to the specially-formed concavity 37 on the plate undersurface said water is deflected outwardly and downwardly onto the lower deflector plate 33, where it flows radially outwardly toward the plate periphery 34. Said water is effectively supported on and by said plate 33 so that it is maintained in the form of a continuous cohesive sheet as it leaves the plate periphery, the tapered design of the spacing members 39 permitting said water to be directed into the annular gas passage around substantially the entire circumference of the plate. As said water sheet reaches the periphery of the plate 33 it is directed upwardly at a slight angle by the inclined surface 34 adjacent the plate edge so that said sheet is presented substantially perpendicularly to the gas stream as the latter flows downwardly over the inclined surface of the plug 28, as indicated by the arrows in FIG. 2.

The downwardly-rushing gas stream collides with the laterally-moving water sheet as the latter leaves the periphery of the plate 33, and due to the accelerated speed of said gas stream as it leaves the Venturi throat and the arrangement of the water sheet transversely thereto, said sheet is sheared off by said high velocity gas stream with an impact that atomizes the water. Thus there is formed a mist-like water spray including a multitude of minute droplets which are distributed throughout the gas stream cross section to impinge and entrain fine dirt particles and other impurities in said gas. In addition to dirt and other solid particles, it is to be understood that soluble gases in said gas stream are also acted upon and effectively removed by said washing liquid.

As the gas stream decelerates and passes from the lower end of the Venturi chamber its downward travel is blocked by the liquid pool 15. In the form of the invention illustrated in FIG. 1 said gas stream, together with the liquid-entrained foreign matter therein, is caused to turn and flow through the impingement trap 24 forming a downward extension of the Venturi chamber. Said trap member may be formed of mesh screening, packing media, or a plurality of staggered baffle elements which are U-shaped in cross section to trap the dirt-entraining liquid as the gas stream passes therethrough. Simultaneously the flow direction of said gas stream is abruptly reversed, the gas passageway turning upwardly 180 degrees as illustrated. The sudden change in direction of the high velocity gas stream causes any dirt-entraining liquid droplets not collected in the impingement trap 24 to be thrown centrifugally from said gas stream into the liquid pool 15 at the bottom of the apparatus.

The cleansed gases are then drawn outwardly through the duct 12 projecting from the side of the housing to be discharged to the atmosphere or utilized as desired, or to be subjected to further treating operations.

As hereinabove mentioned, in accordance with the present invention the combination annulus adjustment plug and spray head 28 can be axially adjusted within the expansion section 22 of the Venturi chamber to permit the passageway to be opened or restricted as desired. Thus said gas scrubbing apparatus is variable and can be readily adjusted for efficient operation at different gas supply rates.

In FIG. 4 of the drawing there is shown a modified form of the present invention wherein the downwardly-extending baffle-type moisture impingement trap 24 illustrated in FIG. 1 is replaced by a screening ring 41 which extends laterally outwardly from the Venturi chamber to the wall of the housing 11, said ring functioning both as a moisture impingement trap and as a support for the lower end of the Venturi member. A wire mesh screen 42 may also be mounted over the mouth of the gas exhaust duct 12 to provide supplemental trap means, or said screen member 42 may be utilized in lieu of the moisture traps 24 or 41. In short, while a moisture impingement trap is an essential element of the gas treating apparatus comprising the present invention in order to strain the dirt-entraining liquid droplets from the gas stream, the exact design and arrangement of said trap means can be varied. The invention is not to be limited in this respect.

From the foregoing detailed description it will be seen that the present invention provides a novel variable gas treating apparatus which is an improvement over the devices presently used for the same purposes. To provide more effective cleaning action the present invention includes a pair of novel deflecting plates which are specially formed to cause the washing liquid to be broken up into a multitude of fine droplets which effectively intercept and entrain dirt particles and other suspended matter in the gas stream. Said improved gas treating apparatus also includes moisture impingement trap means for straining the dirt-entraining liquid droplets from the gas stream, and downstream of the washing chamber the gas passageway is provided with a 180 degree bend to further promote the separation of the dirt-entraining liquid from said gas.

It is to be understood that while a preferred embodiment of the present invention has been illustrated and described herein, numerous variations or modifications in said structure will undoubtedly occur to those skilled in the art. What is intended to be covered herein is not only the illustrated form of the invention but also any and all variations or modifications thereof as may come within the spirit of said invention, and within the scope of the following claims.

What we claim is:

1. An exhaust gas conditioning apparatus, comprising: a housing; a gas supply conduit extending downwardly into said housing; a Venturi chamber formed in said gas conduit within said housing, said Venturi chamber including a converging section for accelerating the gas stream, a throat, and a lower expansion section; a washing liquid supply pipe projecting upwardly into said Venturi chamber expansion section to a point adjacent the Venturi throat and being axially movable therein; a lower deflector plate on the upper end of said liquid supply pipe, said plate having an orifice through which washing liquid delivered through said pipe passes and said plate being provided with an outwardly inclined peripheral portion causing washing liquid flowing radially outwardly thereover to be directed upwardly at an angle from the horizontal; an upper deflector plate supported on and spaced above said lower deflector plate, said upper plate having a concavity formed in its undersurface and said upper plate forming the bottom of an upwardly-tapered plug that is axially movable within the Venturi chamber in response to movement of said axially-movable liquid supply pipe to vary the size of the gas passageway; means for delivering washing liquid upwardly through said supply pipe and discharging the same against the undersurface of said upper plate, the concavity in said plate surface causing said liquid to be deflected downwardly onto said lower plate where it is directed radially outwardly into the gas passageway to collide with the descending gas stream, the inclined nature of said lower plate peripheral portion causing the washing liquid to enter the surrounding gas passageway in a plane substantially perpendicular to the gas stream flowing downwardly over the inclined surface of said tapered plug, said high velocity gas stream breaking up said liquid and creating a multitude of minute droplets which intercept and entrain dirt particles suspended in said gas stream; and means in said housing downstream of said Venturi chamber for removing dirt-entraining liquid droplets from said gas stream.

2. The gas conditioning apparatus recited in claim 1 wherein said upper deflector plate is supported on spacer members positioned on top of said lower plate which are tapered to provide minimal resistance to the washing liquid to be introduced into the gas passageway around substantially the entire circumference of said plate.

3. The gas conditioning apparatus recited in claim 1 having a liquid nozzle in said gas conduit upstream of said Venturi chamber adapted to discharge liquid against the wall of said conduit to minimize dirt particle abrasion and wear.

4. The gas conditioning apparatus recited in claim 1 and having a cylindrical core mounted on and around said liquid supply pipe within the Venturi expansion section to minimize energy loss during deceleration of the gas stream therein.

5. The gas conditioning apparatus recited in claim 1 wherein said means for removing dirt-entraining liquid from the gas stream includes wire mesh screening in said housing.

6. The gas conditioning apparatus recited in claim 1 having a liquid pool in the bottom of said housing, and having means in said housing downstream of the Venturi chamber reversing the flow direction of the gas stream to cause dirt-entraining liquid droplets therein to be thrown centrifugally from said gas stream into said liquid pool.

7. The gas conditioning apparatus recited in claim 1 wherein said housing is provided with an inclined bottom with a drain pipe communicating with and depending from the lower end thereof, said inclined bottom preventing a buildup of sediment in the bottom of said housing.

8. The gas conditioning apparatus recited in claim 7 including a tubular extension depending from the center portion of said housing bottom through which said axially-movable washing liquid supply pipe extends, there being a drain pipe depending from said tubular extension communicating with said bottom drain pipe, and there being an overflow pipe communicating with said housing at a point spaced above the bottom thereof and extending downwardly and communicating with said bottom drain pipe.

9. The gas conditioning apparatus recited in claim 1 wherein projecting upwardly from the apex of said tapered plug is an elongated vertical rod which is axially movably projected through a spider bracket mounted in the housing upper portion, said rod functioning to ensure the centering of said plug as well as minimizing vibration and fatigue of parts.

10. The gas conditioning apparatus recited in claim 1 wherein a wire mesh screening ring is mounted on and extends laterally outwardly from said Venturi chamber to the wall of the housing; wherein a gas exhaust duct communicates with and extends laterally outwardly from the side of said housing above said wire mesh ring; and wherein wire mesh screening is mounted in covering relation over the communicating opening in said exhaust duct, said wire mesh screening providing moisture impingement trap means to strain the dirt-entraining liquid droplets from the gas stream.

References Cited

UNITED STATES PATENTS

| | | | |
|---|---|---|---|
| 1,637,597 | 8/1927 | Ulrici. | |
| 2,046,500 | 7/1936 | Carter | 23—178 |
| 2,060,166 | 11/1936 | Bowen | 261—118 |
| 2,075,344 | 3/1937 | Hawley | 261—79 |
| 2,585,205 | 2/1952 | Young | 261—118 X |
| 2,716,509 | 8/1955 | Saul | 222—173 |
| 3,116,348 | 12/1963 | Walker | 261—62 X |
| 3,182,977 | 5/1965 | Erni | 261—112 |
| 3,369,344 | 2/1968 | Jackson et al. | 55—20 |
| 3,406,953 | 10/1968 | Moore | 261—79 |

FOREIGN PATENTS

| | | |
|---|---|---|
| 16,113 | 5/1904 | Austria. |
| 1,361,725 | 4/1964 | France. |
| 161,969 | 1/1958 | Sweden. |

DENNIS E. TALBERT, JR., Primary Examiner

U.S. Cl. X.R.

55—227, 230, 239, 240, 242, 252, 259; 261—116, 118